United States Patent [19]
Krafka et al.

[11] Patent Number: 5,566,536
[45] Date of Patent: Oct. 22, 1996

[54] MOWER-CONDITIONER PLATFORM SUSPENSION INCLUDING SINGLE UPPER ARM AND HYDRAULIC CYLINDER FOR PLATFORM LIFT

[75] Inventors: Jerry L. Krafka; Roger D. Stephenson; Michael J. Verhulst, all of Ottumwa, Iowa

[73] Assignee: Deere & Company, Moline, Ill.

[21] Appl. No.: 422,965

[22] Filed: Apr. 17, 1995

[51] Int. Cl.$^6$ ............................................. A01D 34/03
[52] U.S. Cl. .................................... 56/15.2; 56/15.7
[58] Field of Search ................................. 56/15.1, 15.2, 56/15.7, 15.8, 16.3

[56] References Cited

U.S. PATENT DOCUMENTS

| | | |
|---|---|---|
| 3,241,300 | 3/1966 | Fell et al. . |
| 4,187,664 | 2/1980 | Meek et al. . |
| 4,565,056 | 1/1986 | Heidjann ........................... 56/15.8 X |
| 4,676,053 | 6/1987 | Pruitt ................................ 56/15.8 X |
| 4,970,848 | 11/1990 | Neuerburg et al. ................. 56/15.8 X |
| 4,972,661 | 11/1990 | Roden ............................... 56/15.8 X |
| 5,076,042 | 12/1991 | Koorn et al. ...................... 56/15.2 X |
| 5,353,580 | 10/1994 | Wolff ................................ 56/15.2 |

*Primary Examiner*—Terry Lee Melius
*Assistant Examiner*—Heather Shackelford

[57] ABSTRACT

A mower-conditioner platform or header is suspended from the main frame of the mower-conditioner by a pair of transversely spaced lower links and a single upper link or lift arm. A hydraulic lift cylinder is connected directly to the lift arm. The lift arm is mounted between the main and platform frames in a manner for permitting the lift arm to undergo a given amount of side-to-side movement about its connection with the main frame in response to relative vertical movement between the opposite ends of the platform as the platform travels over uneven ground contour during cutting operation, and for limiting the side-to-side movement of the upper link to an amount considerably less than said given amount when the platform is raised to its transport position. Three different connection points are provided at the forward end of the lift arm for connection to the platform frame and by selecting different ones of these points different platform cutting angles may be obtained. A transport lock is provided for holding the lift arm in its raised position and the mounting of the cylinder is such as to permit the latter to be stroked when the lock is engaged without any forces being transferred to the lift arm or lock.

14 Claims, 3 Drawing Sheets

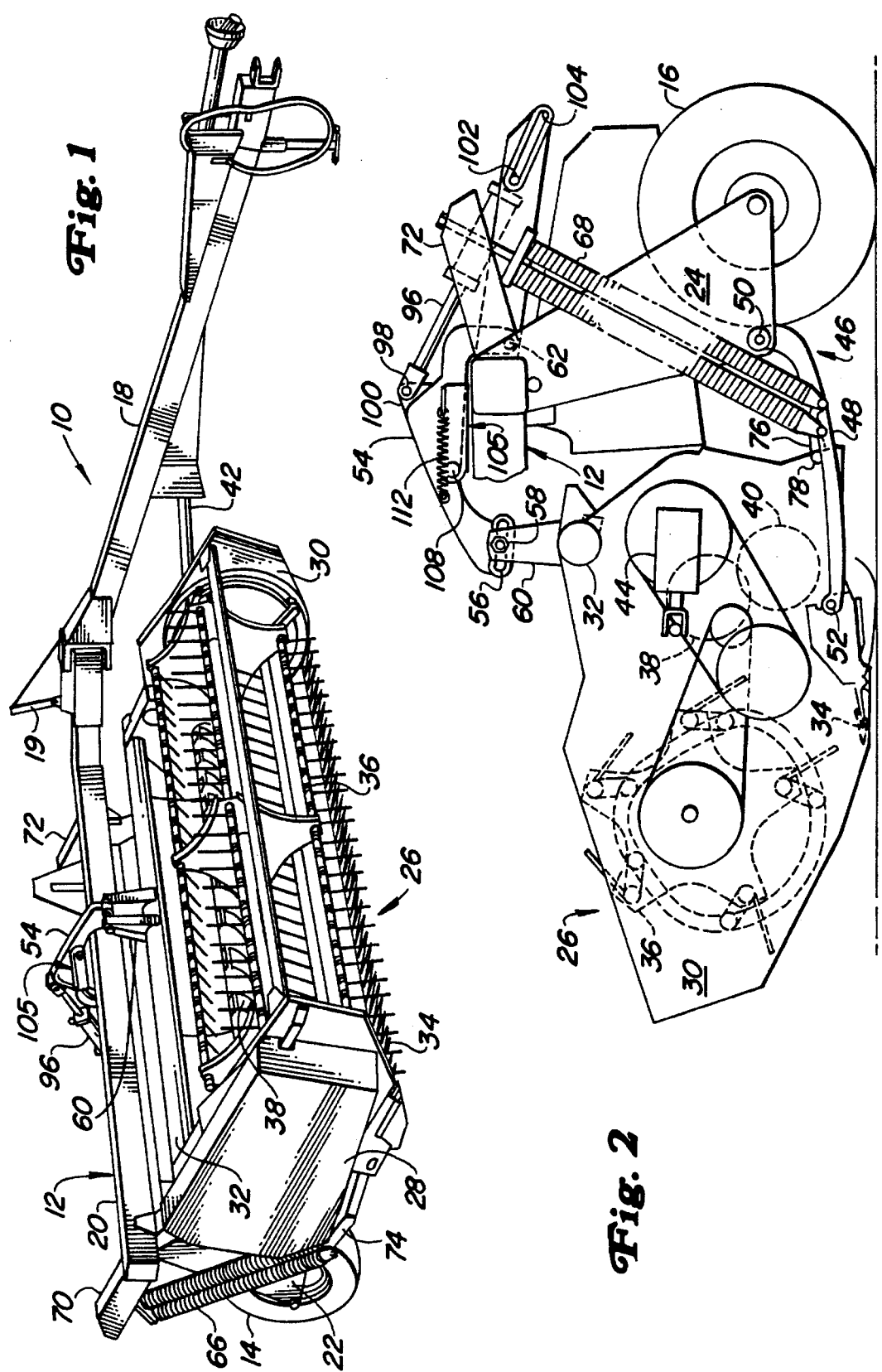

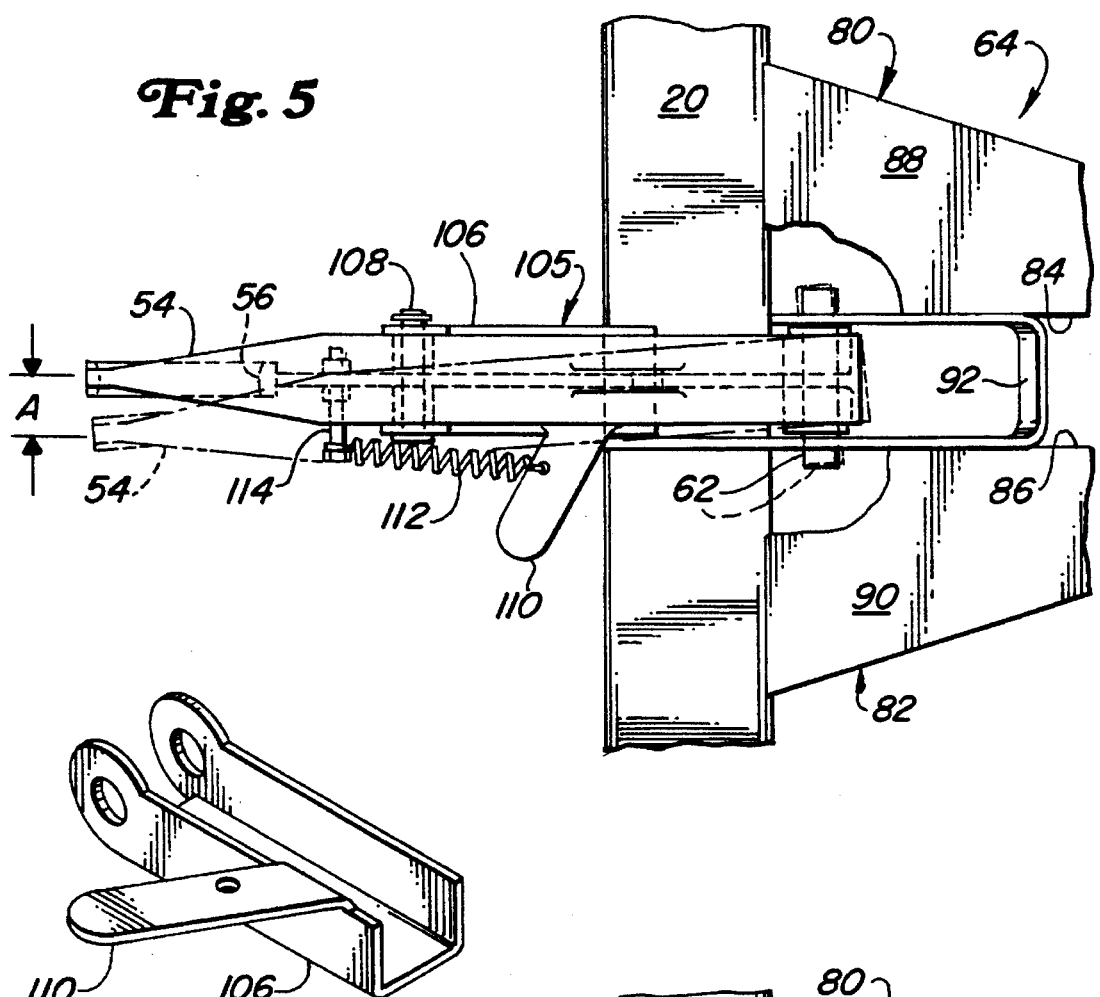
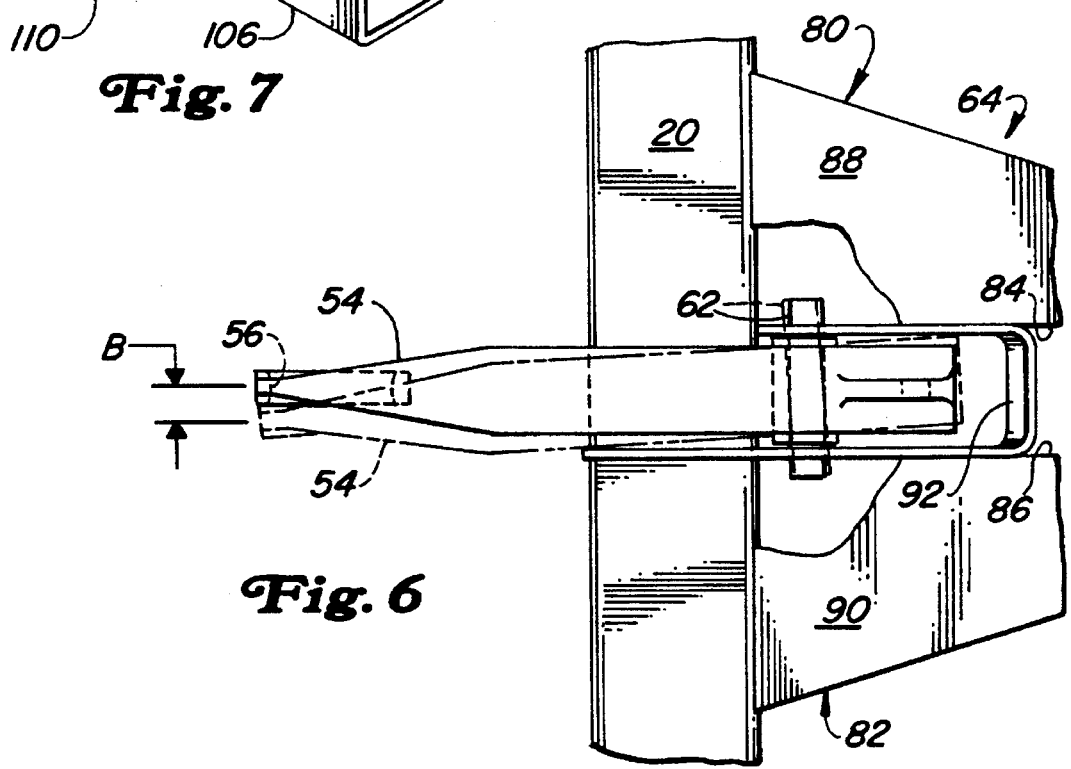

MOWER-CONDITIONER PLATFORM SUSPENSION INCLUDING SINGLE UPPER ARM AND HYDRAULIC CYLINDER FOR PLATFORM LIFT

BACKGROUND OF THE INVENTION

The present invention relates to mower-conditioner platform suspensions and more specifically relates to three-point header suspensions including a single upper arm and integral hydraulic cylinder for lifting the platform.

Mower-conditioner platforms or headers are usually suspended from a support frame so that the platforms float both vertically and laterally, i.e., from side to side, during cutting operation in response to platform skid or gauge shoes encountering irregular terrain or obstacles so that the platforms follow the contour of the terrain to maintain a desired height of cut while avoiding contact of the cutting elements with obstacles.

It is desirable to minimize the cost of platform suspensions while retaining a good floating characteristic. In an attempt to achieve the first objective, designers have created various suspension designs utilizing a single, centrally located upper link and two transversely spaced lower links with a single lift cylinder being connected between the main frame and the upper link. One example of this type of suspension is shown in U.S. Pat. No. 3,241,300 granted to Fell et al on 22 Mar. 1966, and another example is embodied in the Model 904 Mower-Conditioner manufactured by Allis-Chalmers Manufacturing Company and offered for sale in 1969. However, these known designs have the drawback of being somewhat stiff in lateral float due to lack of freedom of motion in the mounting of the upper link.

Such lateral stiffness is overcome by suspension designs embodying a single upper link mounted to the main and platform by ball joint couplings. U.S. Pat. No. 4,187,664 granted to Meek et al on 12 Feb. 1980 discloses such an upper link. A drawback of this upper link is that due to the link being mounted for free side-to-side movement the platform may get into a mode where it undergoes undesirable side-to-side rocking motion during transport.

SUMMARY OF THE INVENTION

According to the present invention there is provided a mower-conditioner having an improved suspension of the type including a single upper link and two lower links, with the upper link to which a hydraulic lift cylinder is directly attached.

An object of the invention is to provide a mower-conditioner platform suspension of the above-noted type wherein the upper link is mounted so as to permit free lateral flotation when the platform is lowered for cutting operation while significantly limiting such motion when the platform is raised for transport. This object is accomplished in accordance with the present invention by coupling the rear end of the upper link to the main frame by a pin located in a near horizontal slot and by mounting the link such that its connection points with the frame and platform are substantially coplanar with the slot when the platform is lowered for cutting operation but are located in a plane that is angled substantially upwardly from the horizontal when the platform is raised to its transport position.

A further object of the invention is to provide a platform suspension of the above-noted type wherein provision is made in the forward end of the upper link for establishing alternate points of connection with the platform for obtaining different desired cutting angles.

Still another object of the invention is to provide a platform suspension of the above-noted type wherein a transport lock is provided for securing the lift arm in a raised position corresponding to the transport position of the platform and wherein a pin coupling the rear end of the lift cylinder to the main frame is located in a slot having a length substantially equal to the stroke through which the piston travels when moving the platform between its lowered and raised position whereby inadvertent actuation of the cylinder when the lock is engaged will merely result in harmless extension of the cylinder.

These and other objects will become apparent from a reading of the ensuing description together with the appended drawings.

BRIEF DESCRIPTION OF THE DRAWINGS

FIG. 1 is a right front perspective view of a mower-conditioner embodying a platform suspension constructed in accordance with the principles of the present invention.

FIG. 2 is a somewhat schematic, left side elevational view of the mower-conditioner omitting the tongue for clarity and illustrating the platform in a lowered cutting position with the transport lock in a stored position.

FIG. 5 is an enlarged top view of the lift arm when in its lowered position, as illustrated in FIG. 2, and showing in broken lines the lateral movement of the lift arm permitted by its mounting.

FIG. 6 is an enlarged top view of the lift arm when raised, as illustrated in FIG. 3, but omitting the transport lock and showing in broken lines the lateral movement of the lift arm permitted by its mounting.

FIG. 7 is a perspective view of the transport lock member.

DESCRIPTION OF THE PREFERRED EMBODIMENT

Preliminarily, it should be noted that in various places in the description below elements are described as being in pairs when only one of the pair is shown. Further, all terms such as "right", "left", "front", "rear", etc. are made with reference to an observer standing behind and facing the machine.

Figure 3:
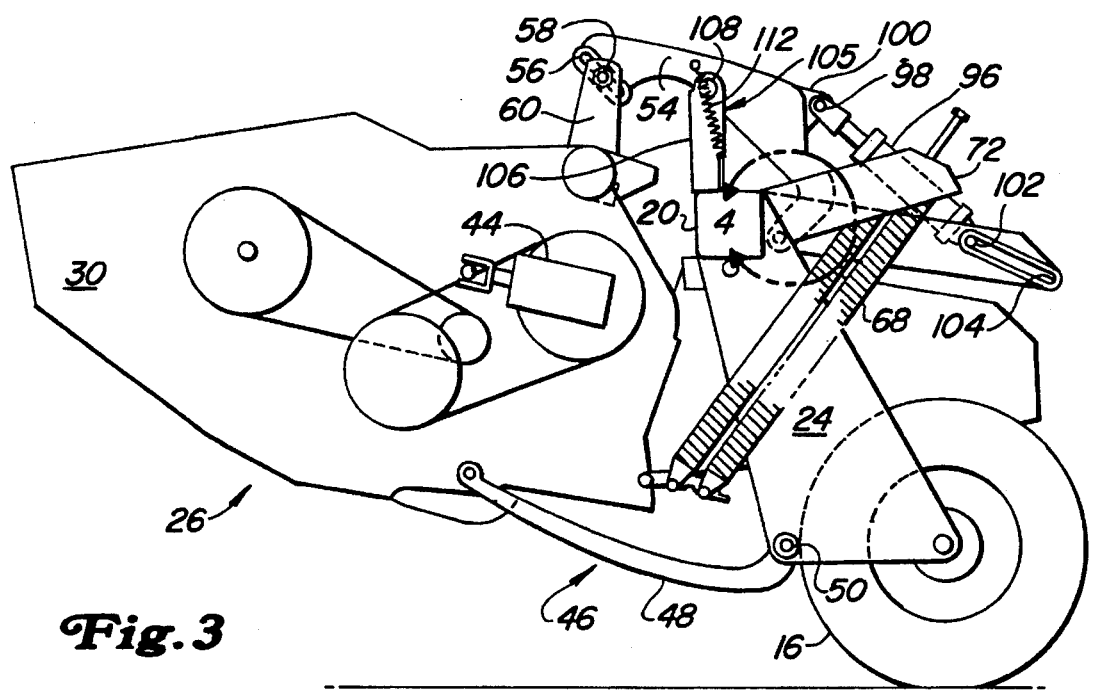
FIG. 3 is a left side elevational view like FIG. 2 but showing the platform in a raised transport position with the transport lock in its engaged position.

Referring now to FIGS. 1–3, there is shown a mower-conditioner 10 of a towed type including a main frame 12 supported on right- and left-hand ground wheels 14 and 16, respectively, and to an upper left-hand location of which a draft tongue 18 coupled for being selectively swung about a vertical axis and releasably latched in place by a latch 19 acting between the frame and tongue. The frame 12 includes a horizontal, tubular cross member 20, of rectangular or square cross section, joined to right- and left-hand, transversely spaced, substantially trapezoidal upright legs 22 and 24, respectively having diverging front and rear surfaces joined by a substantially horizontal bottom surface. The wheels 14 and 16 are respectively rotatably mounted to lower rear locations of the legs 22 and 24.

Located forwardly of and disposed in parallel relationship to the cross member 20 is a platform or header 26 comprising a frame including right- and left-hand, upright side walls 28 and 30, respectively, having upper rear locations interconnected by a tubular cross member 32. A cutting device, here disclosed as a sicklebar 34, extends between and is joined to lower front locations of the side walls 28 and 30. A reel 36 is supported in the side walls 28 and 30 for rotation for sweeping a crop, just cut by the sicklebar 34, into the bite of upper and lower, counter-rotating conditioner rolls 38 and 40, respectively, as is conventional. A drive line 42 is supported by the tongue 18 for transferring power from the PTO of a towing tractor (not shown) to a gear box 44 carried on the left-hand side wall 30. The gear box 44 (FIGS. 2 and 3) has an output shaft which is coupled by a drive train comprising gears and/or pulleys and belts for effecting reciprocation of the sicklebar 34 and rotation of the reel 36 and conditioner rolls 38 and 40. It is here noted that the presence of drive elements on the side wall 30 results in the center of gravity of the platform 26 being offset leftwardly of a fore-and-aft vertical plane located centrally between the opposite side walls 28 and 30, the significance of this fact being discussed below.

A float suspension or linkage 46 is provided for coupling the platform 26 to the frame 12. Specifically the suspension 46 comprises a pair of lower links 48 having their respective rear ends pivotally coupled, as at pins 50, to lower front locations of the frame legs 22 and 24 and having their respective front ends pivotally coupled, as at pins 52, to lower central locations of the side walls 28 and 30. The suspension 46 further includes a single upper link or lift arm 54 having its forward end provided with an elongate mounting slot 56 (a plurality of spaced holes could be used) with a bolt 58 being clamped at a selected location therealong and having opposite end portions serving as a pivot pin attaching the arm 54 to a mounting bracket 60 fixed to and projecting upwardly from the platform frame cross member 32. The rearward end of the arm 54 is pivotally attached, as at pin 62, to a mounting bracket 64 fixed to and projecting rearwardly and slightly downwardly from the main frame cross member 20. The suspension 46 also includes right- and left-hand pairs of tandem-mounted counterbalance or float springs 66 and 68, respectively, having upper ends connected to right- and left-hand brackets 70 and 72, respectively, fixed to and projecting rearwardly from the main frame cross member 20 at respective locations just outside the wheel mounting legs 22 and 24. Lower ends of the pairs of springs 66 and 68 are respectively coupled to rearwardly extending arms of right- and left-hand crank arms 74 and 76, respectively, pivotally mounted by respective pins 78 to lower rear locations of the platform side walls 28 and 30. In a conventional manner (not shown), the upper conditioning roll 38 is mounted for vertical swinging movement towards and away from the lower roll 40 by a pair of arms respectively pivotally mounted to the side walls 28 and 30. A motion transfer link (not shown) is coupled between arms of each of the crank arms 74 and 76 and a respective one of the roll support arms whereby the float springs 66 and 68 act both to counterbalance a predetermined amount of the weight of the platform and to yieldably resist movement of the upper conditioner roll 38 away from the lower roll 40, as is known in the art. Also, the force exerted by the springs 66 and 68 is removed when the platform is raised. This enables a slug of crop located in the gap between the rolls 38 and 40 to be more easily removed.

Figure 4:
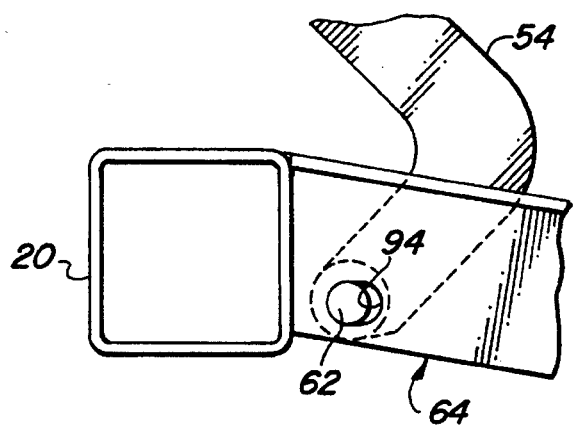
FIG. 4 is an enlargement of the encircled area 4 of FIG. 3 showing the slot receiving the lift arm mounting pin.

Returning now to the details of the mounting of the lift arm 54, it can be seen from FIGS. 5 and 6, for example, that the bracket 64 includes right- and left-hand sections 80 and 82 that are mirror images of one another and respectively include vertical parallel walls 84 and 86 extending perpendicular to and having their forward ends welded to the cross member 20. Bent at a right angle to and extending transversely outwardly from the walls 84 and 86 are respective top walls 88 and 90 having the shape of a right triangle with a forward leg thereof being welded to the cross member 20. A forwardly opening, U-shaped reinforcing member 92 is located between and has its legs welded to respective front portions of the vertical walls 84 and 86. The arm mounting pin 62 is received in transversely aligned openings located in the legs of the member 92 and in the walls 88 and 90, the openings being elongated in the fore-and-aft direction and cooperating to define a lateral float slot 94 (FIG. 4) having a length less than twice the diameter of the pin 62. A lift cylinder 96 has its rod end coupled, as by a pin 98, to an apertured lug 100 at the top of the lift arm 54 while the head end of the cylinder is located between rearward locations of the bracket walls 84 and 86 and coupled thereto by a pin 102 received in transversely aligned, elongate, upwardly and forwardly inclined openings provided in the walls 84 and 86 and cooperating to define a vertical float slot 104. The length of the slot 104 is equal to the stroke length of the piston rod of the cylinder 96 as it moves the arm 54 between lowered and raised positions, this length having a significance explained below. It is here noted that the size of lift cylinder 96 required to raise the platform 26 through direct action on the arm 54, as opposed to acting through a bell crank, is minimized due to the fact that the lift arm 54 is located in a fore-and-aft vertical plane passing through the center of gravity of the platform 26 and thus being located leftwardly of the vertical plane extending fore-and-aft at a location equi-distant from the platform side walls 28 and 30.

The lateral float slot 94 is located in a lower front location of the bracket 64 and, thus, is adjacent a lower rear location of the main frame cross member 20. The arm 54 is inverted U-shaped and, hence, is arched between its opposite ends such that, when the platform 26 is lowered to a ground-engaging cutting position, as shown in FIG. 2, the arm is arched over the cross member 20, with the bolt 58 and pin 62 being located approximately in a common horizontal plane. This disposition of the bolt 58 and pin 62 relative to each other is favorable to the pin 62 becoming freely cocked one way or the other in the lateral float slot 94 such as to permit free lateral float of the platform 26 in response to relative vertical movement between the opposite ends of the platform 26. For example, if either the right-hand end of the platform raises relative to the left-hand end or the left-hand end lowers relative to the right-hand end, the right-hand end of the pin 62 will move forwardly and the left-hand end of the pin will move rearwardly in the slot 94 with the forward end of the link or arm 54 moving a maximum distance A (FIG. 5) from a straight forward position. Of course, raising of the left-hand end of the platform 26 or lowering of the right-hand end of the platform will result in the pivot pin 62 becoming cocked in the opposite direction within the lateral float slot 94. The aforementioned favorable relative disposition of the bolt 58 and pin 62 is disturbed when the platform 26 is raised to its transport position, shown in FIG. 3. Specifically, the bolt 58 is elevated to an angle of about 45° from the horizontal which results in the lateral movement of the arm 54 being limited to a maximum distance B (FIG. 6) from a straight forward position, the distance B being less than six-tenths of the distance A. Because of this limitation in the movement of the arm 54, no additional stops are required for preventing lateral floating movements of the platform 26 during transport.

Mounted to the lift arm 54 for selectively latching the latter in its raised transport position is a transport lock 105 including a latch member or prop 106 in the form of a channel having a stored position, as shown in FIGS. 2 and 5, wherein a straight section of the arm 54 is received between the opposite legs of the channel. The forward end of the latch member 106 is pivotally attached, as by a pin 108, to a location of lift arm 54 which is located vertically above the main frame cross member 20 when the lift arm 54 is raised to its transport position, as shown in FIG. 3. Projecting leftwardly from a left rear location of the latch member 106 is a combined handle and spring mounting tab 110 containing an aperture in which is received a hook at one end of a coil extension spring 112 having a hook at its other other end anchored to the lift arm 54 by a pin 114 located such that the spring moves over center when the latch member 106 is pivoted between its stored position, shown in FIG. 2, and its near vertical latch position, shown in FIG. 3. Specifically, the spring 112 has a line of action located above the latch member mounting pin 108 when the latch member 106 is in its stored position so that the spring 112 then acts to retain the latch member in its stored position and has a line of action located forwardly of the mounting pin 108 when the lift arm is in its raised position and the latch member 106 is in its near vertical latch position with its lower end engaged with a horizontal top surface location of the cross member 20. Thus, in order to move the latch member 106 from its stored to its engaged position, it is necessary only to actuate the lift cylinder 96 to become fully retracted, to grasp the tab 110 and flip or toggle the latch member 106 downwardly to its engaged position and finally to relieve the pressure from the cylinder so as to permit the weight of the platform 26 to bring the latch member 106 into contact with the top of the cross member 20.

While it would be possible to provide a vertically projecting bracket atop the cross member 20 to which the lift arm 54 could be pinned for locking the arm in its transport position, such an arrangement would require the removal and reinstallation of the latch pin, this latter step requiring a sometimes difficult task of aligning holes in the bracket and arm for reception of the latch pin.

It is here noted that if the hydraulic lift cylinder 96 is inadvertently actuated when the transport lock 105 is engaged, with the latch member 106 being in its latched position, the slot 104 for permitting vertical flotation during cutting operation will permit the cylinder mounting pin 102 to travel freely to the rear of the slot without any force being transferred to the lift arm 54. Thus, possible damage to the lift arm 54, latch member 106 and other structure associated with the arm and member is avoided.

While the three-point suspension has been disclosed as being associated with a mower-conditioner having a sickle-type cutterbar, reel and pair of conditioner rolls, it is to be understood that it would find equal utility as the suspension for the platform of a mower-conditioner of a known type having a rotary cutterbar and impeller conditioner.

We claim:

1. In a mower-conditioner of the type including a wheel-supported mobile main frame, an elongate platform having a support frame disposed ahead of and extending transversely to a path of travel of the main frame, said platform further including a crop severing device extending between side frame members of said support frame and being fixed to said support frame, a suspension connecting said platform support frame to said main frame and including a pair of transversely spaced lower links having respective rear ends pivotally mounted to lower locations of said main frame and having respective front ends pivotally mounted to lower locations of said platform support frame, an upper lift arm located transversely from and between said lower links and having a rear end pivotally connected to an upper location of said main frame by a first coupling including a first pivot pin inserted in a first set of transversely aligned openings in said main frame and upper lift arm and having a front end pivotally connected to an upper location of said platform support frame by a second coupling including a second pivot pin inserted in a second set of transversely aligned openings in said platform support frame and upper lift arm, and a hydraulic lift cylinder having opposite ends respectively pivotally connected to said main frame and said upper lift arm for serving as the sole means for moving said platform between a lowered cutting position resting on the ground and an elevated transport position, the improvement comprising: said first set of aligned openings including a lateral float slot located in said main frame and having a major axis located approximately on a line of centers determined by said first and second pivot pins when the platform is in its lowered cutting position so as to permit the upper lift arm to swing through a desired range of side-to-side movement, and being oriented at an angle of at least 40° to said determined line of centers when the platform is raised to its transport position to thereby restrict side-to-side movement of said lift arm to an amount considerably less than said desired range, whereby the need for upstops for effecting level transport is eliminated.

2. The mower-conditioner defined in claim 1 wherein said mobile main frame forms part of a pull-type mower-conditioner and includes an upper transverse cross member joined to depending transversely spaced wheel-support legs and a mounting bracket fixed to and projecting rearwardly from said cross member; and said lateral float slot being located in said mounting bracket.

3. The mower-conditioner defined in claim 1 wherein the pivotal connection of a rear end of said hydraulic cylinder is defined by a pin located in a fore-and-aft elongated vertical-float slot having a length permitting vertical flotation of the platform during cutting operation without being resisted by said cylinder.

4. The mower-conditioner defined in claim 1 and further including a transport lock including a latch member pivotally mounted to said lift arm for movement between a stored position, wherein it lies alongside a portion of said latch member, and an engaged position wherein it extends between said arm and a location of said main frame at such an angle as to prevent downward movement of said lift arm from its raised transport position.

5. The mower-conditioner defined in claim 4 wherein said latch member is channel shaped with said lift arm being located in the channel thereof when the latch member is in its stored position.

6. The mower-conditioner defined in claim 5 wherein a coil extension spring is mounted between said latch member and said lift arm so as to move over center relative to the pivotal connection of the latch member with the lift arm as the latch member is moved between its stored and latch positions, the line of action of the spring being such that it yieldably resists movement of the latch member from its stored to its latch position and vice-versa.

7. The mower-conditioner defined in claim 1 wherein said mower-conditioner is of a towed type with said main frame including a transverse horizontal cross member; a mounting bracket mounted to and projecting rearwardly from said cross member; and said lateral float slot being located in said bracket.

8. The mower-conditioner defined in claim 7 wherein said bracket includes a fore-and-aft extending vertical float slot spaced rearwardly of said lateral float slot and wherein the pivotal connection of said cylinder with said frame includes a cylinder mounting pin located in said vertical float slot.

9. The mower-conditioner defined in claim 8 wherein said vertical-float slot has a length substantially equal to a stroke length of said lift cylinder as it moves between extended and contracted positions respectively corresponding to said cutting and transport positions of said platform; and a transport lock including a latch member operably connected to said lift arm for movement between a stored position permitting free vertical pivotal movement of said lift arm and an engaged position wherein it acts between said cross member and said lift arm and prevents the latter from moving from a raised position corresponding to the contracted position of said lift cylinder, whereby inadvertent operation of said cylinder when said latch member is in its engaged position will merely result in said cylinder mounting pin traveling rearwardly in said vertical float slot.

10. The mower-conditioner defined in claim 7 wherein said lateral float slot is located adjacent a bottom side of said cross member; and said lift arm being arched between its front and rear ends with said cross member extending therebeneath.

11. The mower-conditioner defined in claim 10 and further including a transport lock including a latch member pivotally mounted to a portion of the lift arm, that is arched above said cross member, for movement between a stored position, wherein it lies closely adjacent said lift arm so as not to interfere with vertical pivotal movement of said lift arm, and an engaged position wherein it projects substantially vertically from said lift arm, when the latter is in a raised position corresponding to the transport position of the platform, and has a lower end in engagement with said cross member so as to prevent downward movement of the lift arm.

12. The mower-conditioner defined in claim 1 wherein said platform has a center of gravity which is offset to one side of a transverse center of said platform; and said lift arm being mounted in fore-and-aft alignment with said center of gravity to thereby minimize the size of cylinder required to lift the platform without using a force-multiplying bell crank.

13. The mower-conditioner defined in claim 1 wherein said second coupling includes alternate connection points provided in the forward end of said lift arm whereby selecting different ones of said connection points results in a change in the platform cutting angle.

14. The mower-conditioner defined in claim 13 wherein said alternate connection points are defined by an elongated mounting slot which is oriented so as to extend fore-and-aft when the lift arm is in a lowered position, whereby selecting different locations along said mounting slot results in a change in the platform cutting angle.

* * * * *